(12) United States Patent
Chatroux et al.

(10) Patent No.: US 8,519,685 B2
(45) Date of Patent: Aug. 27, 2013

(54) DEVICE FOR CONTROLLING A POWER SUPPLY WITH DC DC SPLITTING OF THE TYPE INCLUDING N INTERLACED PATHS

(75) Inventors: Daniel Chatroux, Teche (FR);
Jean-Claude Dolhagaray, Saclay (FR);
Francis Roy, Les Ulis (FR)

(73) Assignees: Commissariat a l'Energie Atomique et aux Energies Alternatives, Paris (FR);
Peugeot Citroen Automobiles SA, Velizy Villacoublay (FR)

( * ) Notice: Subject to any disclaimer, the term of this patent is extended or adjusted under 35 U.S.C. 154(b) by 353 days.

(21) Appl. No.: 12/933,774

(22) PCT Filed: Mar. 18, 2009

(86) PCT No.: PCT/EP2009/053205
§ 371 (c)(1),
(2), (4) Date: Sep. 21, 2010

(87) PCT Pub. No.: WO2009/115555
PCT Pub. Date: Sep. 24, 2009

(65) Prior Publication Data
US 2011/0020720 A1    Jan. 27, 2011

(30) Foreign Application Priority Data
Mar. 21, 2008  (FR) .................................... 08 01575

(51) Int. Cl.
*G05F 1/59*        (2006.01)
*G05F 1/613*       (2006.01)

(52) U.S. Cl.
USPC ......... 323/272; 323/225; 323/284; 363/21.02

(58) Field of Classification Search
USPC ................ 323/225, 268, 281, 272, 350, 271, 323/282, 284; 363/21.02, 21.03
See application file for complete search history.

(56) References Cited

U.S. PATENT DOCUMENTS

| 6,084,790 A * | 7/2000 | Wong .............................. 363/71 |
| 2007/0013350 A1 | 1/2007 | Tang et al. |
| 2008/0238390 A1 * | 10/2008 | Trivedi et al. ................. 323/283 |
| 2008/0272752 A1 * | 11/2008 | Qiu et al. ....................... 323/272 |

FOREIGN PATENT DOCUMENTS

| WO | 0247242 | 6/2002 |
| WO | 2007148354 | 12/2007 |

* cited by examiner

*Primary Examiner* — Gary L Laxton
(74) *Attorney, Agent, or Firm* — Nicolas E. Seckel (57) ABSTRACT

In a power supply with n interlaced conversion cells, a control device activates m paths out of n paths, $1 \leq m \leq n$, as a function of the power or of the current handled by the power supply. The cell may have a boost, buck, buck/boost, Cuk, or SEPIC topology.

9 Claims, 8 Drawing Sheets

DEVICE FOR CONTROLLING A POWER SUPPLY WITH DC DC SPLITTING OF THE TYPE INCLUDING N INTERLACED PATHS

CROSS-REFERENCE TO RELATED APPLICATIONS

This application is a National Stage of International patent application PCT/EP2009/053205, filed on Mar. 18, 2009, which claims priority to foreign French patent application No. FR 08 01575, filed on Mar. 21, 2008, the disclosures of which are incorporated by reference in their entirety.

FIELD OF THE INVENTION

The present invention relates to a power supply with DC DC splitting, with n interlaced paths, and more particularly a device for controlling such a power supply.

The invention applies notably to the supply of a regulated direct-current voltage of determined level, based on the energy supplied by a fuel cell.

BACKGROUND OF THE INVENTION

Fuel cells are used in many applications. They are for example used as a source of energy in electric motor vehicles, or for recharging batteries, for example for recharging batteries of portable devices (telephones for example).

Non-isolated power supplies with DC DC splitting, also called converters or choppers, are usually used for converting the direct-current voltage supplied by the cell to another direct-current voltage which may be higher or lower and which may have the same polarity or reverse polarity, depending on the topology of the power supply. The power handled by the power supply depends on the output load, that is to say the application that is using the voltage supplied at the output.

The invention is focused more particularly on splitting power supplies of the interlaced cells type. These power supplies make it possible to reduce the ripple of current at the input of the power supply and at the output. Reducing the input and output ripple is a criterion of quality of a splitting power supply. Each cell is a converter. The concept of interlacing arises from the fact that the cells supply in phase shift the power to an output capacitor which can be common to the cells or specific to each cell.

The interlaced cells are each a DC DC converter. They all have the same topology which is chosen depending on the range of power and on the gain that is sought for the application in question. The various well known power supply topologies that are used in these power supplies are the voltage step-up, called "boost", voltage step-down, "buck", voltage inverter and step-up/step-down, "buck-boost", or "Cuk" topologies from the name of its inventor, voltage step-up/step-down or SEPIC ("Single ended primary inductor converter").

In a manner common to these various topologies, each DC DC conversion cell is an electric circuit that is usually tripolar with one input terminal, one output terminal and one common terminal. This electric circuit comprises at least one switch and a diode and an energy storage element, typically an inductor. The input voltage is applied between the input terminal and the common. An output capacitor is connected between the output terminal and the common. Energy is transferred from the input to the output by means of the energy storage element, which stores the energy and then restores it at the rate of switching of the switch in the open state and the closed state. Voltage regulation is performed by the conduction time (closed state) of the splitting switch.

The switch S is usually produced by a field effect transistor. That is why reference is made without distinction to a switch in the open state, or off-state, and in the closed state, or on-state. Typically in the range of input and output voltages from a few volts to several thousands of volts, use is preferably made of a transistor of the IGBT (Isolated Gate Bipolar Transistor) type, capable of withstanding high voltages at its terminals. This technological solution makes it possible to ensure the reliability of the converter while minimizing the cost of the components.

Figure 1A:
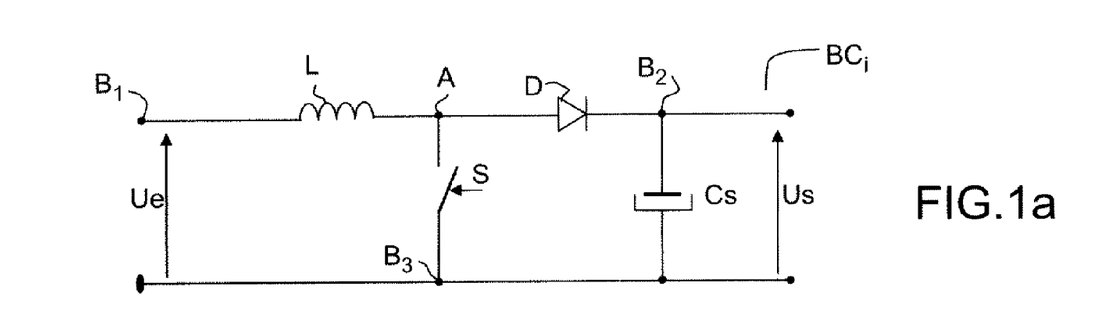
FIGS. 1a, 1b, 1c, already described, illustrate a voltage step-up cell of the boost type, and its two operating phases.
Figure 1B:
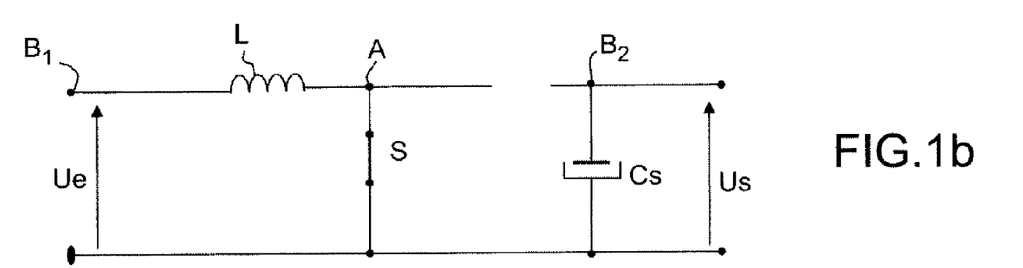
Figure 1C:
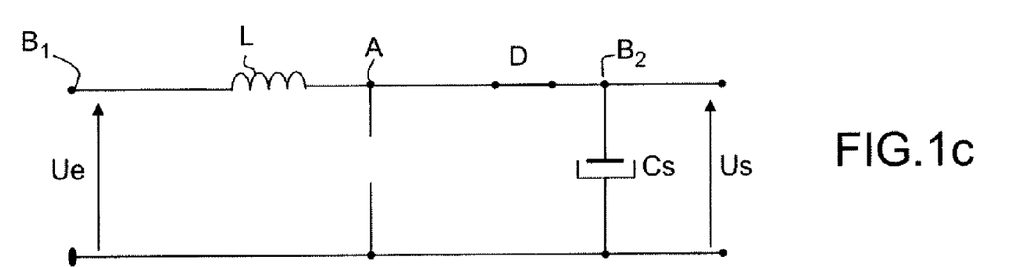
Figure 2:
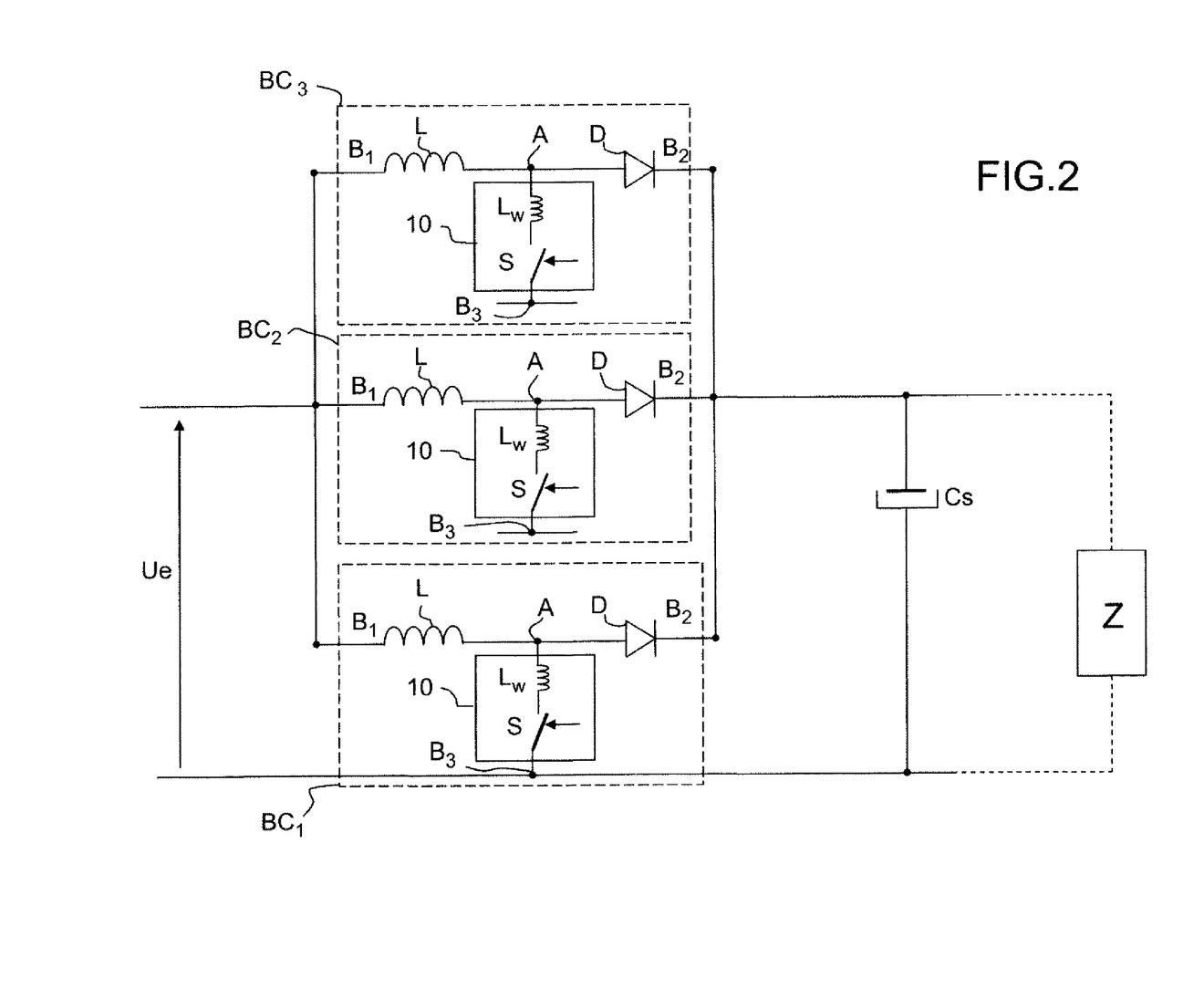
FIG. 2 illustrates an example of a non-isolated power supply with DC DC splitting with interlaced cells, to which a control device according to the invention can apply, and which preferably comprises, in each cell, a resonant circuit in which the switch is placed.

The operation of a cell, and that of a power supply with interlaced cells will be reviewed with respect to FIGS. 1a to 1c, giving details of the structure and the operation of a $BC_i$ cell, and FIG. 2 giving details of a power supply comprising three cells of this type, $BC_1$, $BC_2$ and $BC_3$.

The BCi conversion cell (FIG. 1a) is a tripolar cell with a star topology: a switch S, an inductor L and a diode D each form a branch of the tripole. All the branches start from a common node A and their termination forms one of the three terminals of the tripole.

In the example illustrated, the topology of the BCi cell is that of a BC voltage step-up (boost) converter. The switch S is connected between the node A and the common terminal B3. The diode has its anode connected to the node A, and its cathode connected to the output terminal B2. The inductor L is connected between the input terminal B1 and the node A.

The splitting switch S is controlled in the usual manner in pulse-width modulation mode by a pulse signal with a constant frequency f which places it alternately in a closed state, for a closure time marked at and an open state, for an open time lasting t-αt, α being the cyclical ratio between the time the switch is closed and the complete period of the cycle (t=1/f).

The two operating phases of such a converter, which correspond to the two states, closed and open, of the switch S, are as follows:

when the switch S is closed: the inductor L is in parallel on the input voltage source and the current increases in the inductor. This is the energy storage phase. The diode D is then disabled. The equivalent wiring diagram is illustrated in FIG. 1b.

when the switch S is open, the inductor L is in series with the input voltage source $U_e$. The current passes through the inductor L and the diode D and the output capacitor $C_s$ is charged. This is the energy transfer phase. The equivalent wiring diagram is illustrated in FIG. 1c. The voltage at the terminals of the output capacitor $C_s$ becomes higher than the input voltage.

The output voltage level depends in practice on the durations of the open and closed times of the switch. If the splitting power supply works at a constant frequency f and in continuous conduction mode (that is to say that the current passing through the inductor is never cancelled out), the output voltage Us is equal to $\alpha*Ue$.

FIG. 2 illustrates a splitting power supply with n interlaced cells charging a single output capacitor Cs.

In the example, n=3 cells BC1, BC2, BC3 that are identical (L, S, D) and in parallel: their terminals B1 are connected together; their terminals B2 are connected together; their terminals B3 are connected together. The power supply comprises a single output capacitor Cs connected between the output terminal B2 and common terminal B3 of each cell. The input voltage Ue is applied between the input terminal B1 and common terminal B3 of each cell.

In this figure, the cells have the same converter topology, i.e. voltage step-up (boost), as the cell shown in FIG. 1a.

The n=3 splitting switches S are each controlled as indicated with reference to FIGS. 1a to 1c, at the same splitting frequency f, but the various paths are offset relative to one another by a time shift of fixed duration, corresponding to a phase shift between each cell of 2π/nf. The frequency of the currents and of the voltages seen by the load is therefore n times greater than that which is obtained with a single cell. The input ripples and the ripples in the output capacitor are reduced.

The invention focuses notably on an enhancement of these power supplies with n interlaced cells, an enhancement which advantageously makes it possible to ease the placement of the various components with regard to evacuating heat and reducing or even cancelling the voltage or current ripple at the input and the output due to the inductances of wiring caused by the connections to be made between the various elements of the power supply. These are notably the wiring inductances $L_w$ in series between the switch S and the diode D of each cell which disrupt the charge transfer loop (switch S, diode D, output capacitor $C_S$). When the power supply includes one output capacitor per cell, these also are the wiring inductances between the output capacitors (not illustrated in FIG. 2). In this enhancement, the splitting switch S of each cell is placed in a resonant circuit which is shown schematically by a simple rectangle referenced 10 in FIG. 2, and which contains the switch S.

This resonant circuit 10 makes it possible to lock the splitting switch at zero current in order to transfer from the storage phase to the energy transfer phase. The locking occurs also at zero voltage. The technical effect produced by a locking without loss is notably to ensure that the wiring inductances of the charge transfer loop (T, D, C) have no effect on the efficiency of the power supply. Therefore, even though the wiring inductances are high, they no longer have an effect in the conversion.

Figure 3:
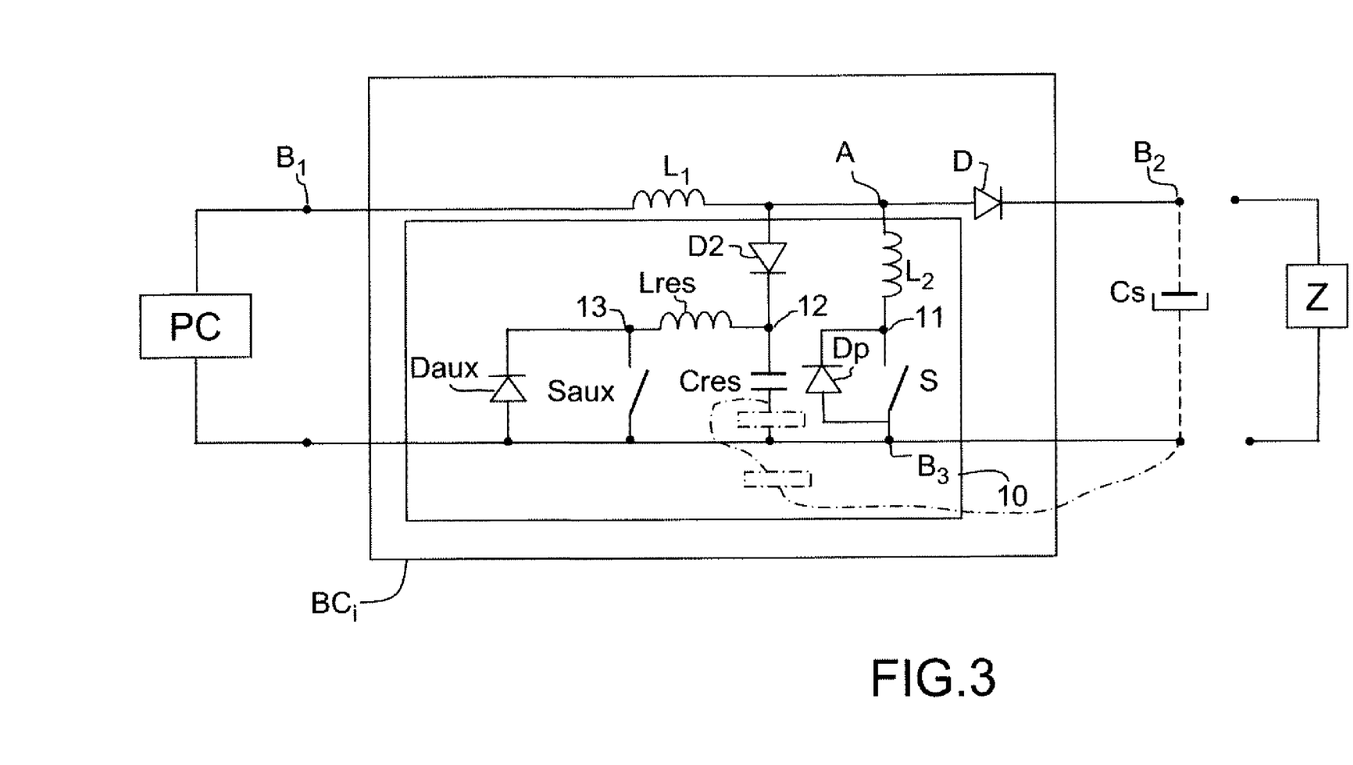
FIG. 3 is a detailed wiring diagram of an embodiment of such a resonant circuit.

FIG. 3 gives for one cell of the supply details of an embodiment of this resonant circuit 10 applicable to the power supply topology shown in FIG. 2 or to a similar power supply topology but with one output capacitor per cell.

The efficiency of the power supply is improved relative to interlaced structures with no resonance. As a comparison, in a power supply with interlaced cells with no resonance, it is usual to obtain efficiencies of the order of 92% to 93% at full power. With resonance, these efficiencies at full power reach 96%, that is a gain of the order of 3% to 4%.

Usually, full power means the maximum power transferred by the converter, the limit being fixed by the nature of the components used.

In practice, a power supply does not always work at full power, that is to say that the current that is called for by the load can vary. This can depend on the application, because a power supply is designed for a certain power range, which allows it to be used for different applications. But then, all the applications do not have the same power requirements. Moreover, the power required by a given application may vary over time.

However, if the power supply does not work at full power, the gain in efficiency obtained with the interlaced structure with resonance is less, and is even reversed. This can be explained by the fact that a resonant circuit that comprises by definition resonant elements—resonance inductor and resonance capacitor—, is the source of specific power losses. The importance of these losses depends only on the level of output voltage that will charge the resonance capacitor. The energy handled by the resonant circuit depends specifically on the output voltage which charges the resonance capacitor. This output voltage modifies the energy stored by the resonance capacitor and therefore modifies the energy that is handled by the resonant circuit of the cell. These losses are independent of the power handled by the cell. It can therefore be understood that, depending on the conditions of use of the power supply, these losses of the resonant elements are of greater or lesser importance.

To illustrate this problem, the table inserted below shows the efficiency η of a given power supply with n interlaced cells with a resonant circuit (n=3), as a function of the power handled by the power supply.

The power P handled by the power supply typically depends on the required output level Vs and on the current Is called for by the output load, that is to say on the conditions of use of the power supply.

The table shows the efficiency η of the power supply corresponding to the ratio between the output power and the input power as a function of the level of output voltage required Vs, on the level $V_E$ of input voltage, and on the power P handled by the power supply.

| P (kilowatts) | $V_E$ (volts) | $V_S$ (volts) | η (percent) |
|---|---|---|---|
| 2 kW | 200 V | 360 V | 90.5% |
|  |  | 300 V | 91.9% |
|  |  | 245 V | 94.5% |
| 5 kW | 170 V | 360 V | 94.4% |
|  |  | 300 V | 95.6% |
|  |  | 245 V | 96.3% |
| 8 kW | 140 V | 360 V | 95.2% |
|  |  | 300 V | 95.6% |
|  |  | 245 V | 95.9% |
| 9 kW | 140 V | 360 V | 95% |
|  |  | 300 V | 95.5% |
|  |  | 245 V | 96% |

In this table, for the power supply taken as an example, with which these figures have been obtained, the maximum power is 9 kW.

It can be seen in this table that the efficiency varies with the conditions of use: the efficiency deteriorates with a lower handled electric power. Notably, at a low power handled by the power supply, 2 kW in the example of the table, the efficiencies become lower than those of the power supplies with no resonance.

Although the level of loss of all the resonant circuits of the converter can be limited to levels of the order of 1% to 2% of the total power of the converter by using efficient capacitors of the polypropylene type with low serial resistance armature and planar inductors, a drop in efficiency is still observed when the power supply does not work at full power. Typically, for fixed losses in the resonant elements corresponding to 1.5% of efficiency at full power, these fixed losses correspond to a drop in efficiency of 4.5% when the converter works at a third of its power.

SUMMARY OF THE INVENTION

A particular object of the invention is therefore to handle the degraded efficiency of a power supply with interlaced cells due to fixed power losses in the resonant circuit.

More generally, its object is to improve the efficiency of a power supply with interlaced cells irrespective of the power level handled by the power supply, when the structure of the power supply causes power losses, of constant level, the share of which therefore increases in proportion when the power handled by the power supply reduces.

An idea at the basis of the invention is to modulate the number of conversion paths which are really activated out of the n power supply paths, as a function of the power level handled by the converter, in order to reduce the share of fixed losses with the reduction of power handled.

The invention therefore relates to a device for controlling in interlaced mode a power supply with DC DC splitting comprising n cells each forming a path for converting an input voltage to an output voltage, the device comprising a circuit for controlling a number of paths to be activated as a function of a level of power or of current in the power supply. According to the invention, for a number m of paths to be activated, said circuit for controlling the number m of activated paths applies a mechanism for rolling between the n available paths.

The invention also relates to a non-isolated power supply with DC DC splitting comprising n cells each forming a conversion path from an input voltage to an output voltage, the paths of which can be activated or disabled by such a control device.

BRIEF DESCRIPTION OF THE DRAWINGS

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive. In these drawings.

DETAILED DESCRIPTION

The invention applies to a non-isolated power supply with DC DC splitting with n interlaced cells $BC_i$ with n being an integer at least equal to 2. Advantageously it applies to a power supply with n interlaced cells, with resonance, as illustrated in FIG. 2.

Figure 4:
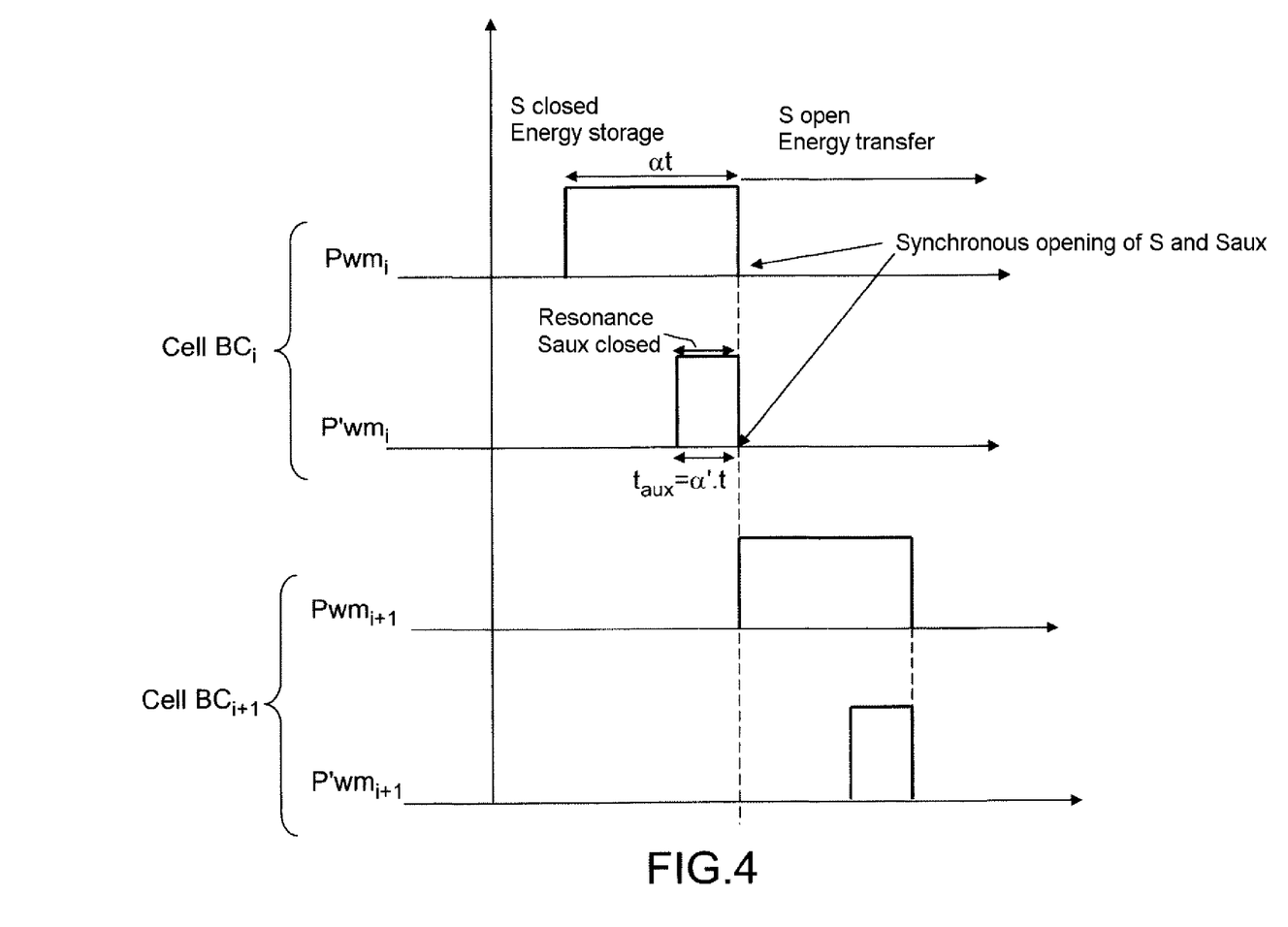
FIG. 4 is a timing chart of the signals for controlling the switches S and the auxiliary switches Saux of two corresponding conversion cells with resonant circuit, used in the power supply illustrated in FIG. 2.

Each cell is comparable with a conversion path. This conversion path is active when, in a power supply conversion cycle, there is a phase of energy storage in the cell, obtained by the control to the closed state of the splitting switch S (FIGS. 2,3,4). The return to the open state triggers the output energy transfer stage. If the switch is never switched to the closed or on state, there is no energy storage phase and consequently there can be no energy transfer. The conversion path is inactive, or disabled.

Figure 11:
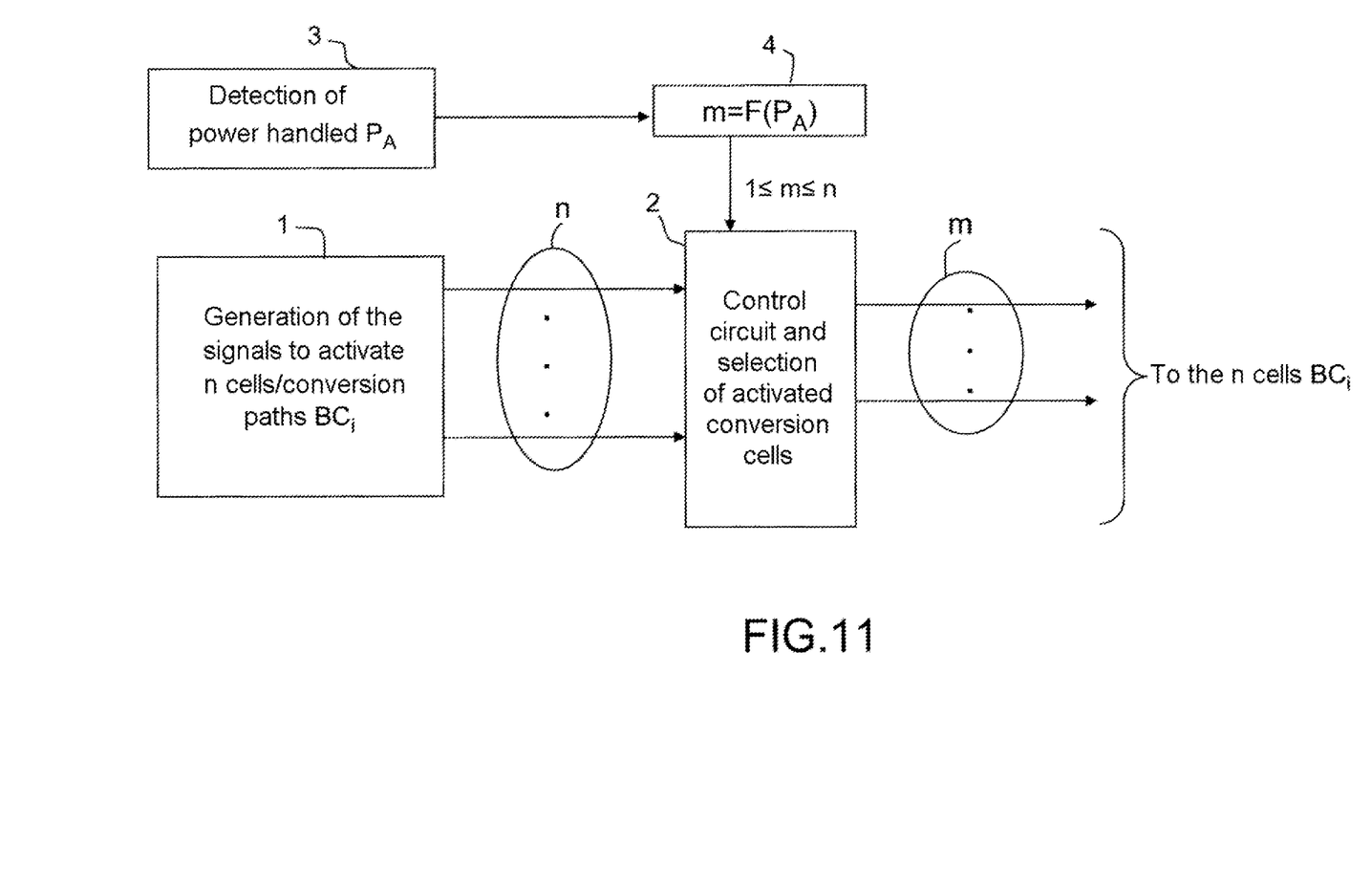
FIG. 11 is a block diagram illustrating the general principle of controlling active paths according to the invention.

According to the invention, and as illustrated in the schematic diagram of FIG. 11, it has been chosen to be able to activate all or some of the power supply paths conditionally, as a function of the power handled or of the current in the power supply. To the usual power supply control circuit 1, which therefore supplies the control signals to be applied to the n paths of the power supply, in order to obtain the operation already described with reference to FIG. 4 notably, is added a circuit 2 for controlling activation of the paths, which, on the basis of a detection of power or of the current handled by the power supply, will permit or prevent the transfer to the cells of these control signals. More precisely, a computation circuit 4 determines in real time a number m of paths to be activated as a function of the power or of the current detected by an appropriate detection circuit 3, a number that it supplies to the circuit 2 for controlling activation of the paths.

Before describing in greater detail a control device according to the invention, it is appropriate to describe the structure of the power supply with its operation and the corresponding control signals.

It has been seen that the invention applied most particularly to a power supply with n interlaced cells as illustrated in FIG. 2, in which the splitting switch S of each cell is placed in a resonant circuit 10, such as the resonant circuit shown in detail in FIG. 3.

The splitting switch S of a cell is connected between the node A and the node B3 as described in the introduction with reference to FIG. 1a. When it is switched to the closed state, it closes the conduction path between these two nodes A and B3, thus looping back the inductor L to the voltage source Ue: this is the energy storage phase (FIG. 1b). When it is switched to the open (or off) state, it opens this conduction path between A and B3, which triggers the phase for transferring energy into the output capacitor Cs (FIG. 1c).

The function of the resonant circuit 10 is to allow the switching to the open state of the switch S at zero current. The transition from the closed state to the open state also takes place at zero voltage. The opening of the switch S is therefore carried out without loss, which allows the energy transfer loop (switch S, diode D, output capacitor Cs) to sustain no losses in the wiring inductances.

The resonant circuit typically comprises a resonance inductor and capacitor. It also comprises an auxiliary switch Saux, by which the resonance phase is triggered, during the energy storage phase, while the switch S is closed.

The resonance phase makes it possible to cancel the current in the switch S. The latter can then be switched to the open state, causing the power supply to switch to the energy transfer phase.

Advantageously it also makes it possible to cancel the current in the auxiliary switch Saux which can be switched to the off state without loss (at zero current).

In the exemplary embodiment illustrated in FIG. 3, the resonant circuit 10 of a cell $BC_i$ comprises:

an inductor $L_2$ connected in series between the switch S and the node A, and a diode Dp connected in parallel to the switch with its anode connected to the node $B_3$ and its cathode connected to the connection point 11 between the switch S and the inductor $L_2$;

a diode $D_2$ and a resonance capacitor Cres connected in series between the nodes A and $B_3$;

an inductor Lres and an auxiliary switch Saux in parallel on the resonance capacitor Cres; the inductor being connected to the connection point 12 between the resonance capacitor Cres and said second diode;

a second diode Daux in parallel on the auxiliary switch Saux, with its cathode connected to the connection point 13 between the auxiliary switch Saux and the inductor Lres.

In practice, the diodes Daux and Dp can each be achieved by a discrete component placed in parallel on the associated IGBT transistor, that is to say in parallel on Saux and S respectively, or else integrated with this transistor in one and the same package.

Figure 5:
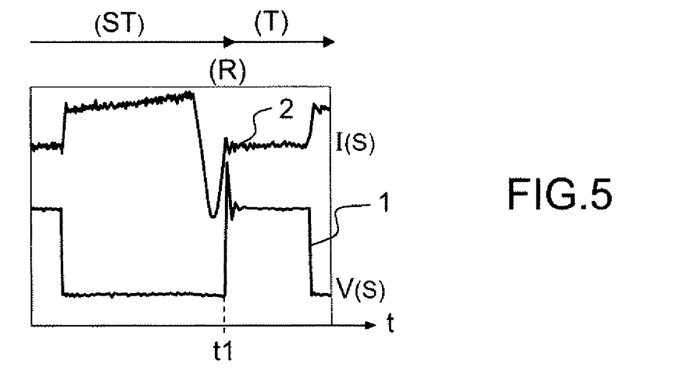
FIGS. 5, 6, 7 illustrate the corresponding current and voltage waveforms obtained in a cell.
Figure 6:
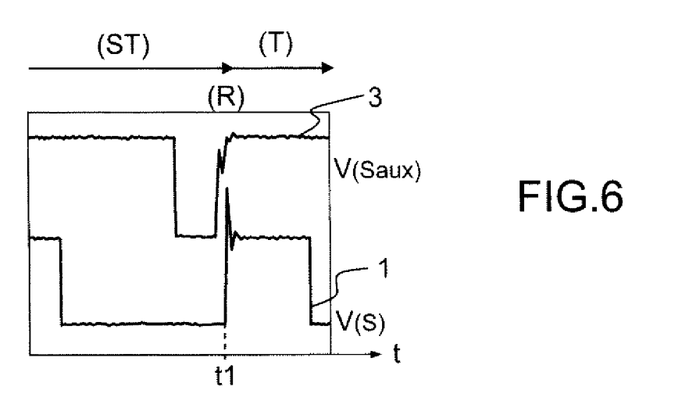
Figure 7:
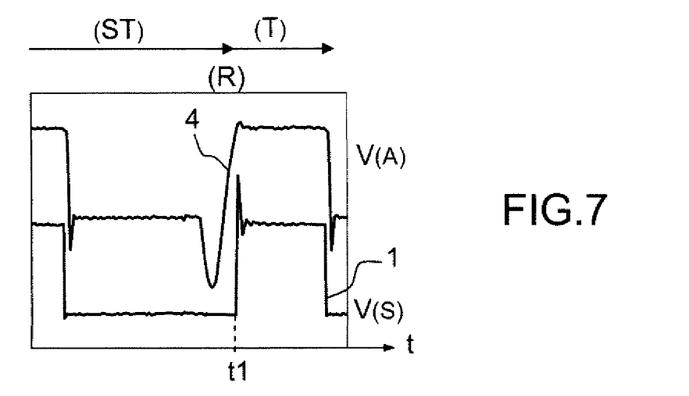

The various operating phases of the cell $BC_i$, with the resonant circuit 10 are illustrated in FIGS. 5 to 7:

Energy storage phase ST: the switch S is controlled to the closed (on) state. The diode D is switched off. The inductor L of the cell accumulates the electric energy in electromagnetic form.

Resonance phase R: the switch Saux is switched to the closed (on) state. The diode D is off; the switch S is always closed.

The switching to the closed state of the switch Saux causes a resonance to be established between the capacitor Cres and the inductor Lres: the voltage at the terminals of the capacitor Cres falls until it is inverted; and the diode D2 is set to conduct when the voltage of its cathode (node 12) becomes lower than that of its anode (node A). The current passing through the diode D2 makes it possible to cancel the current in the switch S. The switch S can be switched to the open state, causing the conversion cell to switch to the energy transfer phase.

When the current in the switch S is cancelled, the diode in parallel Dp makes it possible to allow the inverse current to pass and to terminate the resonance phase, with the inductor L2, which then becomes involved since the diode Dp is conducting: the voltage at the terminals of the switch S is also zero, through the conduction of Dp. The switching of the switch S to the open state can therefore be a soft switching, with no energy losses.

With the switch S switched to the open state, the energy transfer phase begins:

Energy transfer phase T:

The diode D is conducting, the switch S is open and the switch Saux is open. The energy is transferred from the inductor L to the output capacitor Cs. The capacitor Cres is charged at the output voltage Us.

The control of each of the cells of such a power supply in practice requires two control signals, one for each of the switches S and Saux so as to switch these two switches appropriately to the closed and open state and obtain the described operation.

Marked Pwmi and P'wmi are the signals for controlling the splitting switch S and the auxiliary switch of a cell BCi of the power supply, comprising n cells BCi (i=1 to n).

These signals are in practice generated in a known manner by circuits such as pulse width modulation circuits, at the splitting frequency f and time splitting circuits of a fixed duration so that the various paths are offset relative to one another by a time shift of fixed duration, advantageously equal to $2\pi/nf$.

In a simple embodiment, the various durations (closure time of the switches S and Saux, or shift $2\pi/nf$) can be generated by a programmable circuit on the basis of simulations.

These control signals are illustrated in FIG. 4 for two successive conversion cells BCi and BCi+1. They have the same frequency f. The signals Pwmi and P'wmi of a cell BCi are synchronized so as to synchronously control the opening of the switches S and Saux. It is the duty factor, respectively $\alpha+\alpha'$ and $\alpha'$, which changes between the two signals.

In a more detailed manner, as illustrated in this timing chart, in each cell:

the switch Saux is controlled by a control signal $P'wm_i$, such that the switch Saux conducts (is closed) for a fixed duration $t_{aux}=\alpha't$;

the switch S is controlled by a signal $Pwm_i$, such that the switch S conducts before the switch Saux for a duration at and for the duration $t_{aux}=\alpha't$;

the two switches S and Saux switch to the open (or off) state in a synchronized manner, marking the end of the storage phase and the beginning of the energy transfer phase for the corresponding path.

Let us consider a power supply with the structure that has just been described. Suppose that it comprises n=5 conversion cells that are marked BC1 to BC5

Figure 8:
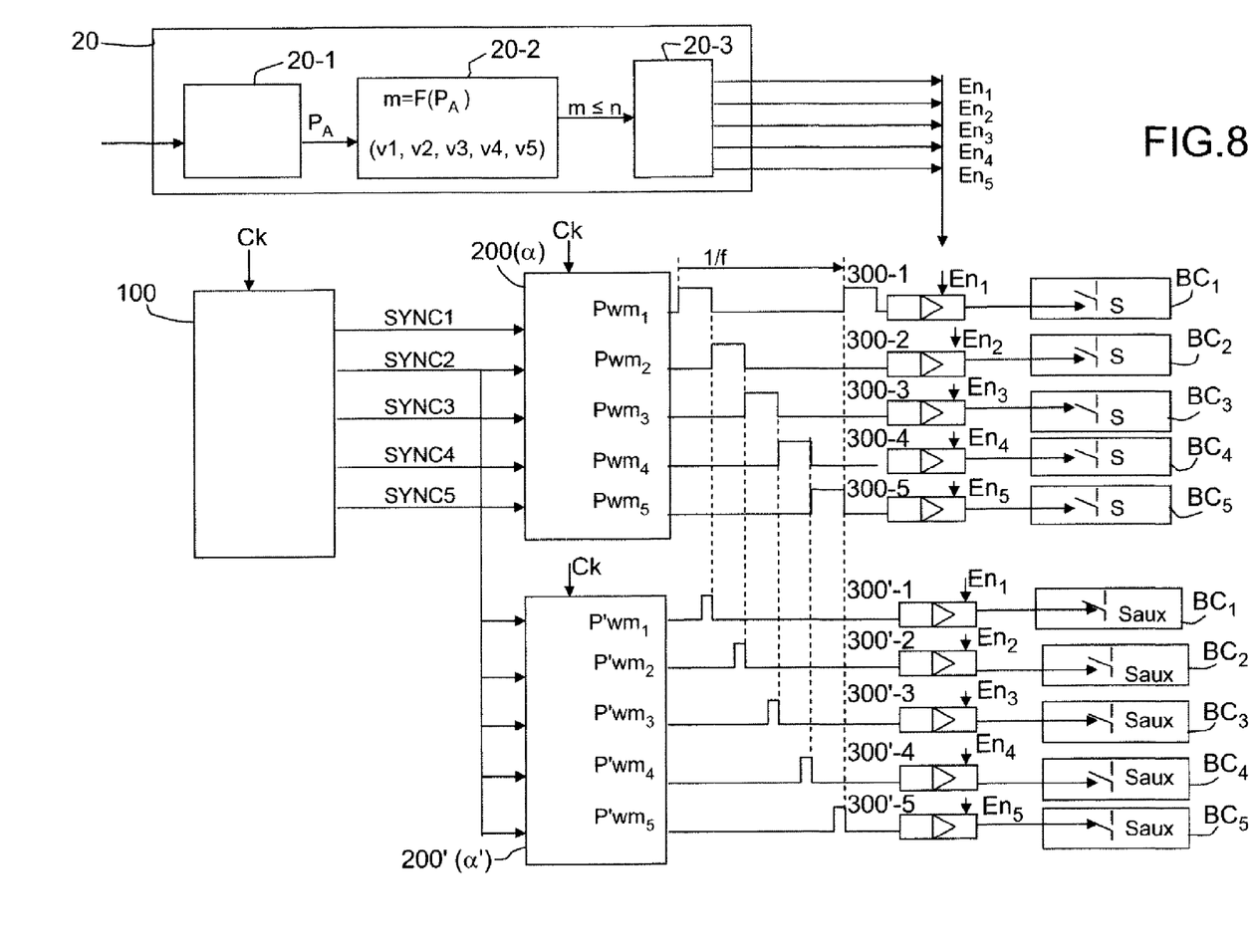
FIG. 8 is a general diagram of a control device of a power supply with n=5 interlaced cells according to the topology illustrated in FIGS. 2, 3a or 3b, including a circuit for controlling the number of active paths (m) according to the invention.

A circuit for generating the signals for controlling the splitting switches S and the auxiliary switches Saux for these five conversion cells BC1 to BC5 is illustrated as an example in FIG. 8. In this example, consideration has been given to the duty factors and fixed time shifts, based on simulation results, so that the signals have the shapes illustrated in FIG. 4.

Such signals are usually generated mainly by means of pulse modulation circuits marked 200 and 200' on the basis of synchronization signals SYNC1 to SYNC5 typically supplied by a programmable circuit 100 based on a clock signal CK. The pulse modulation circuits are, in the example, configured so as to supply the respective control signals with the desired duty factor, namely $\alpha$ for the signals marked Pwm1 to Pwm5 applied to the splitting switches, and $\alpha'$ for the signals marked P'wm1 to P'wm5 applied to the auxiliary switches of the resonant circuits. The programmable circuit is configured to obtain the desired time shift between the synchronization signals ($2\pi/nf$, with n=5 here).

They are applied to the respective switches S and Saux by means of current amplifiers, otherwise called drivers, which are marked 300-1 to 300-5 for those driving the splitting switches S and 300'-1 to 300'-5 for the resonance auxiliary switches Saux.

In the invention, in order to optimize the efficiency of this power supply, taking account of the fixed losses in the resonant circuits, the control device also comprises a circuit 20 for controlling the number of conversion paths activated, as a function of the power PA or of the current handled by the power supply, so as to activate m paths out of the n power supply paths, where m takes a value lower than or equal to n, depending on the value of the power PA or of the detected current. In the example, n=5.

The control circuit comprises a circuit 20-1 for measuring the power or the current handled in order to supply a value $P_A$, a circuit 20-2 for computing the number of conversion paths to be activated as a function of this value, and a circuit 20-3 for generating signals for activating/disabling the conversion paths.

The circuit 20-1 for measuring the power handled supplies a value PA. This circuit for measuring or detecting power corresponds to the circuit 3 of FIG. 11. The power measurement can typically be obtained by a measurement of the current in the output load Z of the power supply (FIG. 2) and a measurement of the voltage at its terminals.

The circuit 20-2 is a circuit for computing the value of m as a function of the detected power PA. It corresponds to the circuit 4 of FIG. 11. It uses a function F(PA) like steps: if n is the number of power supply paths, each step of the function links a value of m on the integers ranging between 1 and n and a range of power delimited by two threshold values.

The number of steps of the function F(Pa) is equal to the number n of paths.

Figure 9:
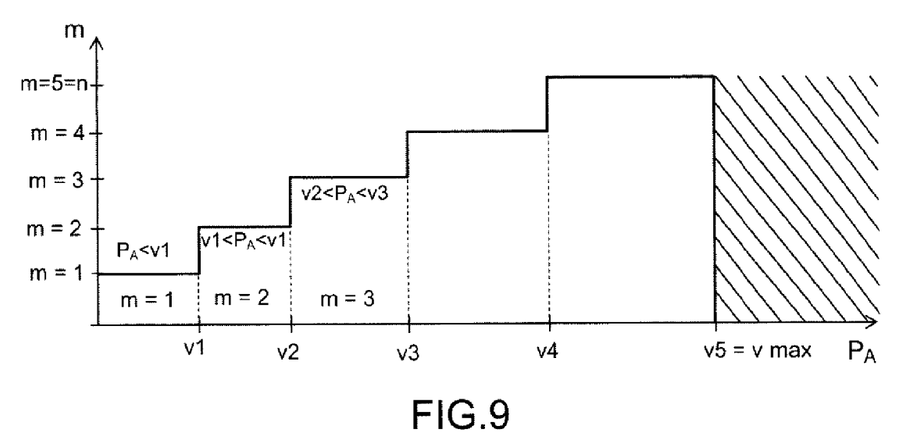
FIG. 9 illustrates the function for determining the number of active paths (m) as a function of the power handled by the power supply, applied in the invention.

This function F(Pa) is illustrated in FIG. 9, where n=5.

A corresponding computation circuit 20-2 can therefore be simply achieved by a circuit for comparing the value PA with threshold values v1, v2, v3, v4, v5 in order to supply a value of m, as a function of the power range in which the detected power occurs.

The threshold values are in practice determined by simulation for a given power supply and as a function of the circuit 20-1 for measuring power used.

In general, if consideration is given to n threshold values classified in ascending order from the first, equal to the smallest value v1, to the nth, equal to the largest value vn, the circuit applies the following rules:

m equals 1 while the detected level PA is lower than the first threshold value (v1);

m equal to i, while said detected level is below the i−1th threshold value (vi−1) and lower than the ith threshold value (vi), where i is an integer between 2 and n.

The value vn preferably corresponds to the maximum power of the power supply.

The computation circuit 20-2 supplies the computed number m to a circuit for controlling the paths 20-3 (circuit 2 in FIG. 11). This control circuit activates a corresponding state of a disabling signal for each path/cell. In the example, this gives 5 signals En1 to En5. This signal is applied in practice to an input for disabling the current amplifiers (300-*i*, 300'-*i*) associated with the switches S and Saux of the respective cell BCi. Out of these 5 signals, m signals activate the corresponding amplifiers, and n−m deactivate them.

In practice, the detection and management of the number m of paths are carried out in real time, in synchronism with the conversion cycles. In other words, the value of m applicable to each conversion cycle is defined. It is possible to make provision to carry out a detection over a longer period. The value of m computed for a detection cycle will then be applied over several consecutive conversion cycles.

Figure 10:
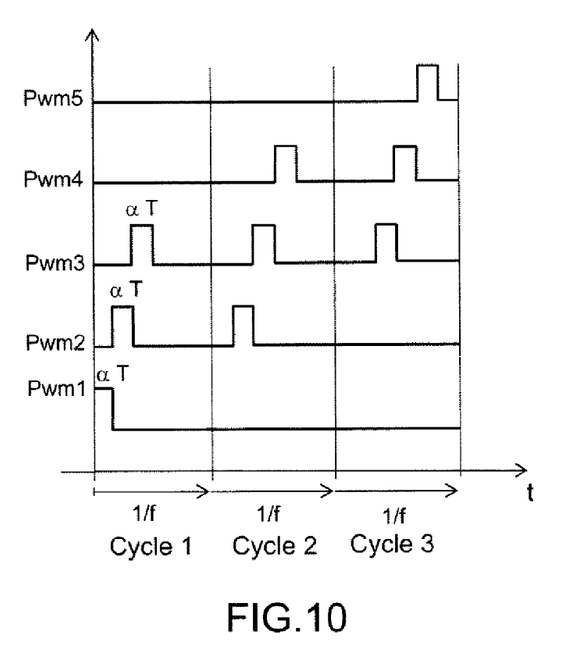
FIG. 10 illustrates a principle of rolling of the m active paths out of the n available paths of a power supply, according to an enhancement of the invention.

In the example illustrated in FIG. 10, this therefore gives m=3 out of 5, and this value m=3 is applied over three consecutive conversion cycles: cycle 1, cycle 2 and cycle 3.

In a basic application of the invention, the circuit for controlling the paths (circuit 20-3 in FIG. 8, or circuit 1 in FIG. 11) determines which paths it activates, and it leaves the others deactivated: the switches of the deactivated paths remain open or not in the on-state.

This being so, the thermal losses of the power supply are no longer uniformly distributed in space.

According to another aspect of the invention, and relating to an application to a power supply comprising a resonant circuit 10 as illustrated and described with reference to FIG. 3, an element for maintaining the charge of the resonance capacitor Cres of the resonant circuit 10 is also proposed.

According to another aspect of the invention, and relating to an application to a power supply comprising a resonant circuit 10 as illustrated and described with reference to FIGS. 3*a* and 3*b*, an element for maintaining the charge of the resonance capacitor Cres of the resonant circuit 10 is also proposed.

Specifically, for a cell that is not activated for one or more conversion cycles, it is worthwhile to limit the discharge of the resonance capacitor Cres by eddy currents. Keeping this capacitor in the charged state will make it possible to ensure the switching without loss of the splitting switch S in the next conversion cycle for which the path will be activated again.

This maintenance element is advantageously a resistor connected between the terminal 12 of the resonance capacitor and an output terminal B2 of each power supply cell. Preferably it will have a value of several hundreds of kiloohms.

In practice, it will be noted that, during the time of stoppage or disabling of converter paths, the gain in input and output ripple of the power supply is less than when all the paths are active. This is however acceptable because it corresponds to conditions of use of the power supply at reduced power and consequently at reduced temperature elevation.

The invention has been described with reference to non-isolated power supplies but it could equally apply to power supplies with isolation (by transformer).

The invention claimed is:

1. A control device for controlling in interlaced mode a power supply with DC-DC splitting, said device comprising:
   n cells each forming a path for converting an input voltage to an output voltage, wherein the control device supplies n pulse-modulated activation signals of a same splitting frequency f, and offset from one another by a fixed time offset, each of said n pulse-modulated activation signals controlling a respective splitting switch of a respective cell among the n cells,
   a control circuit for controlling a number of paths to be activated as a function of a level of power or of current in the power supply,
   wherein, for a number m of paths to be activated that is smaller than n, said control circuit for controlling the number m of activated paths applies a rule that rotates the activated paths in shifts among the n available paths,
   wherein the control circuit drives a respective first disabling circuit for each respective cell among the n cells so as to selectively disable transmission of the activation signals to some of the cells, so that, at each moment, only m activation signals out of n are transmitted,
   wherein the splitting switch of each cell is placed in a switching-aid resonant circuit comprising an auxiliary switch for triggering a resonance phase, wherein said control device supplies n additional pulse-modulated activation signals of the same splitting frequency f, and offset from one another by a fixed time offset, each of said n additional pulse-modulated activation signals controlling a respective auxiliary switch of a respective cell among the n cells,
   wherein the control circuit drives a respective second disabling circuit for each respective cell among the n cells so as to selectively disable transmission of the additional activation signals to some of the cells, so that, at each moment, only m additional activation signals out of n are transmitted.

2. The control device as claimed in claim 1, wherein said control circuit comprises means for detecting a power or a current consumed in said power supply, and means for classifying a detected level, relative to an ordered series of n threshold values, making it possible to match a number m of paths to be activated to a resultant classification, m being an integer and 1≦m≦n.

3. The control device as claimed in claim 2, wherein said means for classifying the detected level determine n threshold values classified in increasing order from a first, a smallest value among the n threshold values, to a nth, a largest value among the n threshold values, and apply the following rules:

m equals 1 while said detected level is smaller than a first threshold value among the n threshold values; and     m equal to i, while said detected level is higher than an i-1th threshold value among the n threshold values and lower than an ith threshold value among the n threshold values, for i being an integer between 1 and n.

4. The control device as claimed in claim 3, wherein the nth value corresponds to a maximum power or current in the power supply.

5. The control device as claimed in claim 1, wherein the resonant circuit of each cell comprises a resonance capacitor and a maintenance element for maintaining a charge of the resonance capacitor.

6. The control device as claimed in claim 5, wherein said maintenance element is a resistor connected between the resonance capacitor and an output terminal of the power supply.

7. A power supply system of a load comprising a fuel cell followed by at least one non-isolated power supply with DC-DC splitting, comprising n interlaced cells, n being an integer at least equal to 2, and a control device as claimed in claim 1 for controlling in interlaced mode the power supply in order to supply a regulated level of direct current voltage to said load.

8. The power supply system as claimed in claim 7, wherein said cells are voltage step-up cells.

9. The power supply system as claimed in claim 7, wherein said cells are one of voltage inverter, step-down, and step-up cells.

\* \* \* \* \*